United States Patent [19]

Romanillos

[11] 4,097,210

[45] Jun. 27, 1978

[54] SYSTEM IN AN INDUSTRIAL POLYEXPANSION PROCESS

[76] Inventor: Federico Hernando Romanillos, Canarias, 46, Madrid, Spain

[21] Appl. No.: 646,367

[22] Filed: Jan. 2, 1976

Related U.S. Application Data

[63] Continuation of Ser. No. 477,042, Jun. 6, 1974, abandoned.

[30] Foreign Application Priority Data

Aug. 22, 1973 Spain .................................. 418.110
Oct. 3, 1973 Spain .................................. 419.306

[51] Int. Cl.² .......................................... B29D 27/04
[52] U.S. Cl. .................................... 425/89; 425/224; 425/290; 425/329; 425/817 C
[58] Field of Search ................ 264/45.8, 46.2, 46.3, 264/46.4, 46.5, 51, 53; 425/4 C, 817 C, 290, 291, 376 R, 296, 301, 308, 89, 224, 329; 156/78, 79

[56] References Cited

U.S. PATENT DOCUMENTS

| 3,240,846 | 3/1966 | Voelker | 425/817 C X |
|---|---|---|---|
| 3,471,906 | 10/1969 | Henry | 425/376 R |
| 3,546,742 | 12/1970 | Kugler | 425/290 X |
| 3,553,300 | 1/1971 | Buff | 425/4 C X |
| 3,744,404 | 7/1973 | Eisendrath et al. | 425/290 X |
| 3,775,522 | 11/1973 | Auge | 425/4 C X |
| 3,812,227 | 5/1974 | Blackwell et al. | 425/4 C X |
| 3,817,671 | 6/1974 | Lemelson | 425/290 X |
| 3,841,811 | 10/1974 | Pielle | 425/817 C X |
| 3,942,925 | 3/1976 | Schmitzer et al. | 425/817 C X |

FOREIGN PATENT DOCUMENTS

17,667  10/1966  Japan ................................ 425/817 C

Primary Examiner—Robert L. Spicer, Jr.
Assistant Examiner—Mark Rosenbaum
Attorney, Agent, or Firm—Eyre, Mann, Lucas & Just

[57] ABSTRACT

An apparatus forms substantially rectangular cross sections of foamed material by depositing the foaming mixture in a trough lined with flexible material, moving the flexible material along at a predetermined rate, placing a continuous sheet of porous flexible separating material atop the foam and allowing a plurality of articulated members to rest upon the expanding surface. The articulated members are rigid transverse to the surface of the foamable fluid but are freely movable in horizontal and vertical directions. The articulated members have substantially flat bottoms and, as the expanding foam is drawn under them, the weight and shape cause the foam to assume a rectangular cross section. Once expansion is completed, the separating material is perforated to increase the escape of gas and allow a smooth flat top surface to result.

13 Claims, 5 Drawing Figures

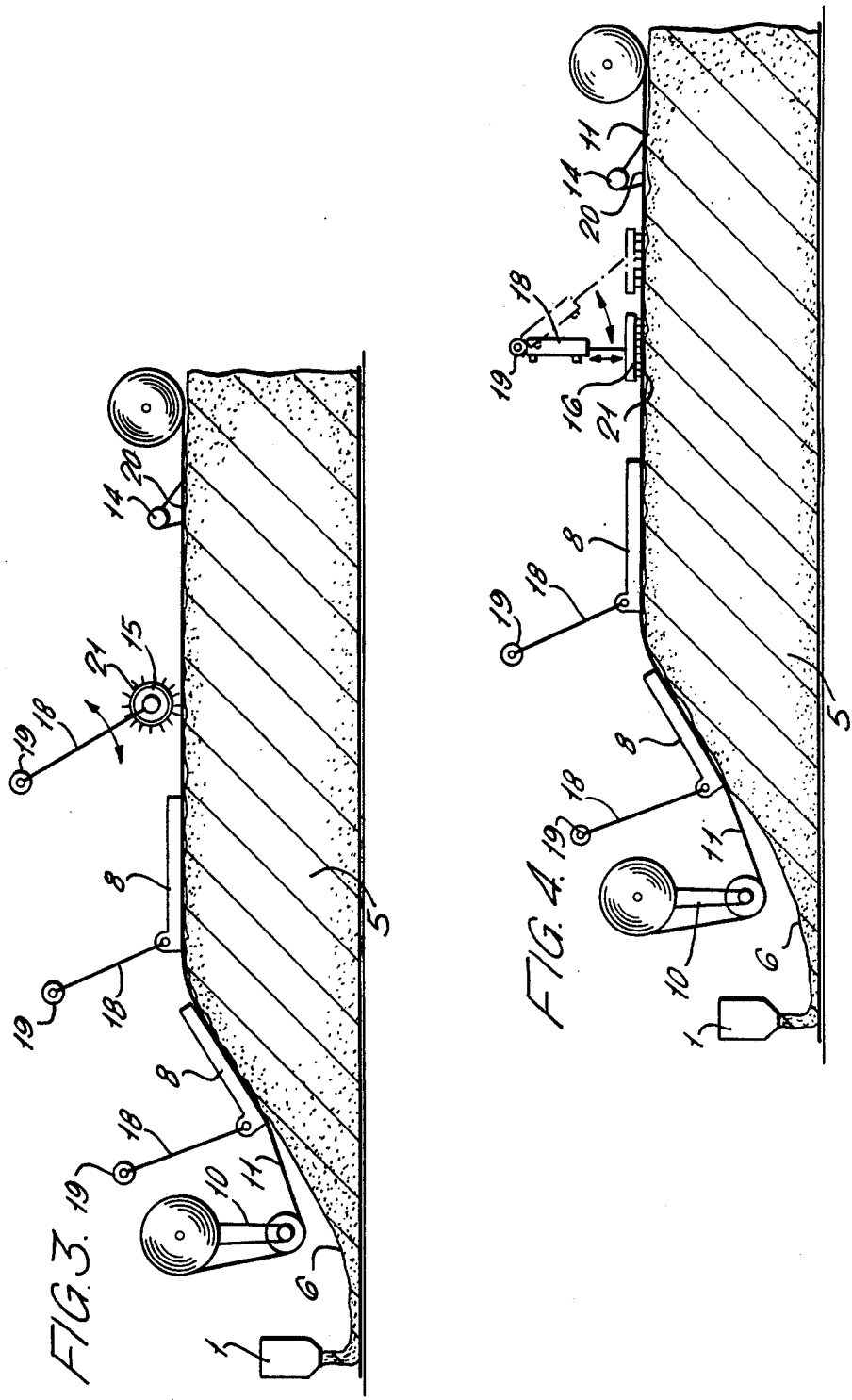

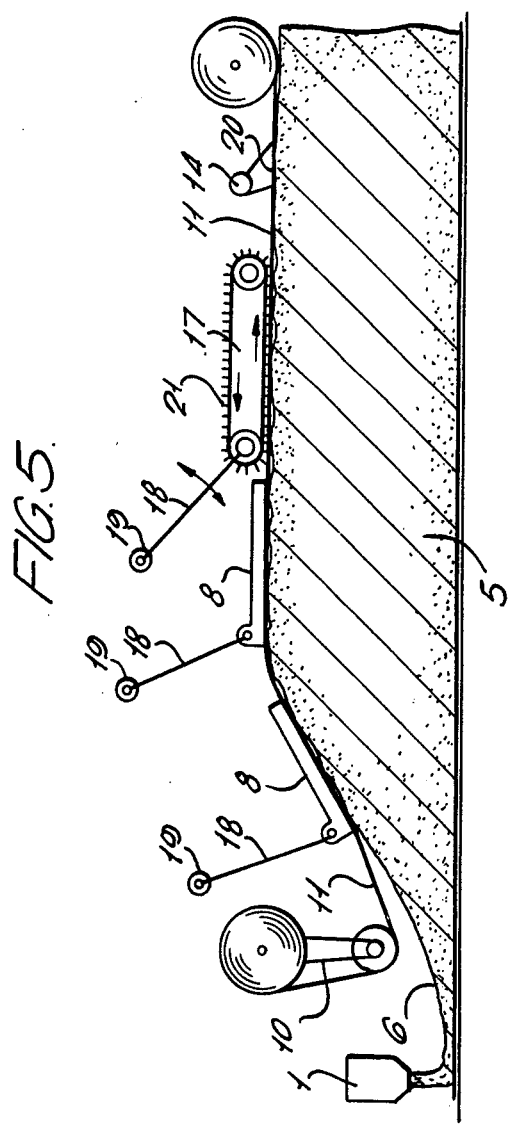

SYSTEM IN AN INDUSTRIAL POLYEXPANSION PROCESS

This is a continuation of application Ser. No. 477,042, filed June 6, 1974, now abandoned.

The invention relates to a system for the continuous manufacture of an expanded cellular polyurethane block of a rectangular or square section having an upper face free of hardness and which is permeable and a uniform density.

One of the basic problems encounted in the manufacture of continuous expanded cellular polyurethane blocks is the making of the free top surface, which is obtained hard, impermeable and with a variable density. All of this is due to the crowning or convex-forming effect which occurs when the liquid foam solidifies and also due to the retention of the gases given off during foaming, the gases being retained between the aforementioned surface and the separating material.

Many processes and methods have been used to try to avoid the aforementioned defects. These have resulted in loss of material, time and money, but none has been successful in eliminating the defects completely, since none has been successful in obtaining a block with a plane surface, nor in eliminating completely the hard and rugose surface and therefore, a variable density.

With the apparatus proposed by the invention, one can completely eliminate the crowning effect, i.e., obtain a continuous block, the free upper face of which is completely plane, having at the same time, a uniform density, and which is permeable and free of hardness, whilst, furthermore, the aspect of the surface is not defective as the gases given off during the foaming are permitted to escape.

According to the invention a distribution surface or plate is applied to the foam, while in the liquid state, the surface plate being situated at the point where the foam begins to expand although still liquid, and preventing the foam rising up more in the center than at the sides. This surface or plate is self-adjustable, in the position of the curvature which the foam adopts during its expansion as well as in its height. This surface can be flexible longitudinally, with regard to the block, and rigid sideways by means of a series of articulated elements, or it may consist of two rigid plates, one situated at the zone where the expansion commences and the other on the horizontal part of the foam.

Further according to the invention a separating material is provided between the distribution surface or plate and the foam, the movement of the material being synchronized with that of the foam. Preferably the material is porous and is secured to the inside of the moving mould at both sides.

So that the abovementioned separating material may permit the occluded gases to escape perfectly, a means is provided which can perforate the said material. Such means may for example be needles or any other pricking system.

To provide a better understanding of the nature of the invention it is discussed with reference to the attached drawings given schematic diagrams of its use, which diagram is not limitative and is susceptible, therefore, to accessory modifications which do not alter the essential characteristics. In the drawings:

FIG. 3 shows a view identical to that of FIG. 2 with the distribution surface formed by two plates and with a perforating roller.

FIG. 4 is a view identical to that of FIG. 3, but using a plate as a perforating element.

FIG. 5 is a view identical to the foregoing ones, but using a conveyor with a perforating belt.

Figure 1:
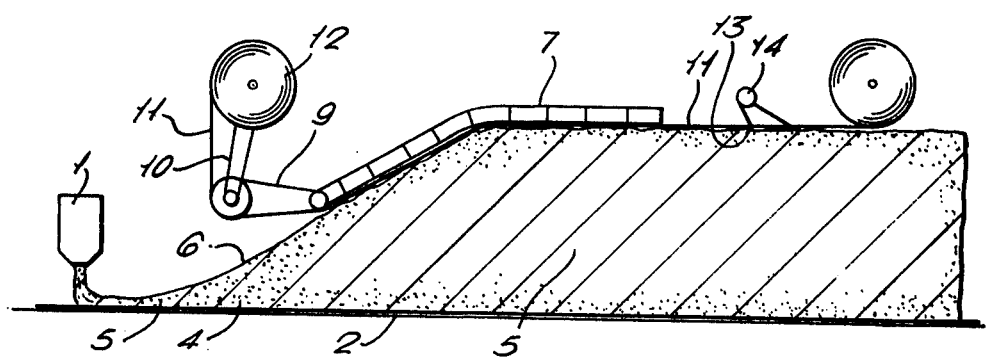
FIG. 1 shows a side view of the system with the distribution surface or plate of the articulated type.
Figure 2:
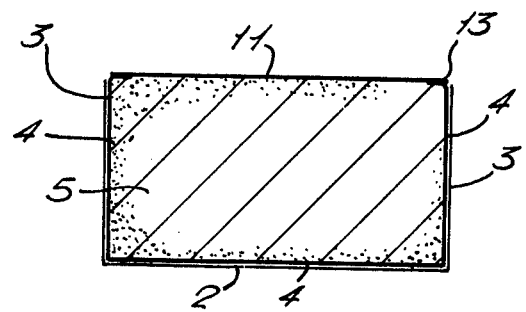
FIG. 2 is a detailed view of the mould and the separating material, containing the already formed foam.

The drawings contain the following details:
1. Discharge regulator.
2. Base.
3. Side walls (seen in FIG. 2).
4. Inside mould
5. Foam
6. Zone where the foam starts to expand
7. Articulated regulation surface
8. Regulating surface in the form of a plate
9. Connecting device.
10. Fixed Bar
11. Separating material
12. Regulating device for the separating material
13. Adhesive tape or adhesive
14. Jointing device
15. Perforating roller
16. perforating plate
17. Conveyor with perforating belt
18. Fixing element
19. Pivoting spindles
20. Upper horizontal zone.
21. perforating elements.

The system proclaimed by the invention consists in the first stage of a discharge of the liquid material by means of a discharge regulator 1, from which foam 5 flows in a liquid state, falls onto the moving base 2 which drags it along, and immediately starts to expand in the zone 6.

Between the base 2, the lateral sides 3 and the foam 5, is provided the mould 4, which moves in unison with the aforementioned foam 5.

So that, when the foam starts to expand, it does not assume a crown on the free surface, the invention proclaims the use at zone 6, of an articulated regulating surface 7 or of a regulator plate 8, which is flexible longitudinally relatively to the block 5, and is rigid sideways. This prevents the foam rising more in the center than at the sides. The device is self regulated, i.e., it is self-regulating with regard to the position of the curvature which the foam 5 assumes during its expansion, as well as with regard to the height of the foam.

Alternately the surface or plate 7 or 8 can regulate its weight in accordance with the requirements of hardness and density of the foam 5 to be obtained, by placing additional weights on it.

The regulating surface may consist on the one hand of the articulated surface 7 which can curve in the longitudinal direction of the foam block 5 and is rigid sideways. This surface 7 is fixed at one of its ends to the fixed bar 10 by means of a connecting device 9. The fixed bar 10 in turn can be positioned in accordance with the position of the discharge regulator 1 and the type of foam 5 which one wishes to obtain.

On the other hand, another practical realization of the system makes provision for the replacing of the articulated regulating surface 7 by two plates 8, one situated at the zone 6 where the expansion commenses and the other in the top horizontal zone 20. These plates are flat and rigid, are attached by means of the fixing elements 18 and have flexibility as a result of the pivoting spindles 19.

In order to prevent the foam 5, expanding and while still in the liquid state, soiling the surface 7 and 8, a separating material 11 is placed between them. This material must be porous so that the gases given off during the expansion of the foam 5 can escape.

This separating material 11 must have a longitudinal movement which is synchronized with that of the foam 5. This is achieved by means of the regulating device 12 which is attached to the fixed bar 10. So as to help the above mentioned material 11 to move synchronously with the foam 5, it is attached at the sides to the inside mould 4 as can be seen from FIG. 2, by means of an adhesive or adhesive tape 13. This work is carried out by the jointing device 14.

Since the separating material 11 although porous retain the gases which should be expelled so that the horizontal surface 20 may become smooth and free of defects, the apparatus provides for perforating of the material 11 so as to enable the gases given off during the expansion of the foam to escape.

The perforating is obtained by means of a device which is capable of perforating the said material 11, such as for instance needles, or any other pricking element 21.

These perforating means 21 are fitted by means of the fixing element 18, and are connected to the pivoting spindle 19, so that a certain elasticity of movement is obtained and thus produces a constant pressure characteristic of the weight of the connection, which can be applied to the surface of the foam 5 via the separating material 11.

It is envisaged that the perforating means can have different practical realizations, such as for instance the roller 15, the plate 16 or the conveyor 17.

In practice when the liquid foam starts to come out of the discharge regulator 1, it is dragged along by the bottom 2 and side walls 3, and is supported in the mound 4. Immediately expansion commences in zone 6, producing a greater expansion in the center than at the sides, due to the crowning effect.

In order to avoid the aforementioned crowning effect, zone 6 is fitted with the articulated surface 7 or the plates 8, which with their transverse rigidity and longitudinal flexibility ensure that the free surface becomes plane, and as a result one obtains a block of a rectangular or square section of uniform density.

To avoid the foam 5 soiling the surfaces 7 and 8 the separating material 11 is placed in between. This material is supplied by the device 12 and is, in turn, by means of the jointing device 14 attached at the sides to the inside mould 4, thus achieving that the whole moves in unison. The jointing device 14 forms a unit which in turn separates the material 11 from the mould once it has completed its function.

I claim:
1. In an apparatus for a polyexpansion process:
   (a) a discharge stage having a base and side walls for receiving an expandable liquid material;
   (b) a self-regulating surface to prevent a crowning effect of the resulting foamed material positioned in the zone where the liquid material is adapted to commence expanding, said self-regulating surface comprising:
      (i) a plurality of elements each of which is rigid in a direction normal to the longitudinal movement of the foam, and
      (ii) means for mounting each said element, said means for mounting being a double pivot whereby each said element is freely movable in the horizontal and vertical directions in response to pressure exerted thereof by the expanding liquid material;
      (iii) said means for mounting being located down stream of said discharge stage; and
   (c) a separating material freely positioned between the foamed material and the self-regulating surface.

2. An apparatus as claimed in claim 1, in which the self-regulating surface comprises a succession of articulated elements which are longitudinally flexible relative to the block of foam.

3. An apparatus as claimed in claim 2, in which the regulating surface is pivotally attached at one end to a fixed bar, situated in the zone where the expansion commences and is free at the other end.

4. An apparatus as claimed in claim 1 in which the regulating surface comprises two plates, one situated in the zone where the expansion starts, and the other in the zone of maximum expansion, on its horizontal part, the plates exerting sufficient pressure to prevent the crowning effect, and being self-adjustable and mounted by means of two pivoting spindles.

5. An apparatus as claimed in claim 1, in which a discharge regulator discharges the liquid material letting it fall onto an inside mould, the mould preventing the floor and side walls from being soiled and having a longitudinal movement which drags the block of foam along so that the manufacturing process is continuous.

6. An apparatus as claimed in claim 5, further comprising adhesive means for attaching the separating material at the sides to the walls of the inside mould at a position downstream of said self-regulating surface, by means of an adhesive so that the movement of the material is synchronized with that of the mould.

7. An apparatus as claimed in claim 1 in which the separating material provided between the foam and the self-regulating surface is basically porous and its movement is synchronized with that of the foam, the separating material preventing the foam from soiling the self-regulating surface and permitting the gases given off during the expansion to escape.

8. An apparatus as claimed in claim 1 in which downstream from the regulating surface is provided a perforating device for the separating material so that the gases given off during the foaming process may escape.

9. An apparatus as claimed in claim 8, in which the perforating element is fitted with a means capable of piercing the separating material, the device being pivotally mounted to which gives it sufficient flexibility in the movement to maintain an adequate and constant pressure for the needs of the foam expansion.

10. An apparatus as claimed in claim 9, in which the perforating element comprises a roller.

11. An apparatus as claimed in claim 9, in which the perforating element comprises a plate.

12. An apparatus as claimed in claim 9, in which the perforating element comprises a conveyor.

13. An apparatus as claimed in claim 1 further comprising means downstream of said adhesive means for continuously removing said separating material after said polyexpansion process is completed.

* * * * *

UNITED STATES PATENT AND TRADEMARK OFFICE
CERTIFICATE OF CORRECTION

PATENT NO. : 4,097,210
DATED : June 27, 1978
INVENTOR(S) : Federico Hernando Romanillos It is certified that error appears in the above-identified patent and that said Letters Patent are hereby corrected as shown below:

Col. 2, line 66: "commenses" should read --commences--.

Col. 4, line 8: "thereof" should read --thereon--.

Col. 4, line 19: "privotally" should read --privotably--.

Col. 4, line 55: delete "to which gives it sufficient flexibility in"

Col. 4, line 56: delete "the movement"

Signed and Sealed this

Fifteenth Day of May 1979

[SEAL]

Attest:

RUTH C. MASON
Attesting Officer

DONALD W. BANNER
Commissioner of Patents and Trademarks